(12) United States Patent
Kondiles et al.

(10) Patent No.: US 11,868,623 B2
(45) Date of Patent: **\*Jan. 9, 2024**

(54) DATABASE MANAGEMENT SYSTEM WITH CODING CLUSTER AND METHODS FOR USE THEREWITH

(71) Applicant: Ocient Inc., Chicago, IL (US)

(72) Inventors: George Kondiles, Chicago, IL (US); Rhett Colin Starr, Long Grove, IL (US); Joseph Jablonski, Chicago, IL (US); S. Christopher Gladwin, Chicago, IL (US)

(73) Assignee: Ocient Inc., Chicago, IL (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/165,603

(22) Filed: Feb. 7, 2023

(65) Prior Publication Data

US 2023/0176752 A1    Jun. 8, 2023

Related U.S. Application Data

(63) Continuation of application No. 17/659,203, filed on Apr. 14, 2022, now Pat. No. 11,599,278, which is a continuation of application No. 17/092,567, filed on Nov. 9, 2020, now Pat. No. 11,334,257, which is a continuation of application No. 15/840,633, filed on Dec. 13, 2017, now Pat. No. 10,868,863.

(60) Provisional application No. 62/433,919, filed on Dec. 14, 2016.

(51) Int. Cl.
*G06F 3/06* (2006.01)
*G06F 16/25* (2019.01)
*H04L 67/1097* (2022.01)

(52) U.S. Cl.
CPC ............ *G06F 3/0619* (2013.01); *G06F 3/067* (2013.01); *G06F 3/0629* (2013.01); *G06F 16/252* (2019.01); *H04L 67/1097* (2013.01); *G06F 3/0679* (2013.01)

(58) Field of Classification Search
CPC ...... G06F 3/0619; G06F 3/0629; G06F 3/067; G06F 3/0679; G06F 16/252; H04L 67/1097
See application file for complete search history.

(56) References Cited

U.S. PATENT DOCUMENTS

| | | |
|---|---|---|
| 5,301,297 A | 4/1994 | Menon |
| 5,423,046 A | 6/1995 | Nunnelley |
| 5,485,571 A | 1/1996 | Menon |
| 5,548,770 A | 8/1996 | Bridges |

(Continued)

OTHER PUBLICATIONS

A new high performance fabric for HPC, Michael Feldman, May 2016, Intersect360 Research.

(Continued)

*Primary Examiner* — Azizul Choudhury
(74) *Attorney, Agent, or Firm* — Garlick & Markison; Bruce E. Stuckman

(57) ABSTRACT

A networked database management system (DBMS) is disclosed. In particular, the disclosed DBMS includes a plurality of nodes, one of which is elected as a designated leader. The designated leader is elected using a consensus algorithm, such as tabulated random votes, RAFT or PAXOS. The designated leader is responsible for managing open coding lines, and determining when to close an open coding line.

20 Claims, 16 Drawing Sheets

(56) References Cited

U.S. PATENT DOCUMENTS

| | | | |
|---|---|---|---|
| 5,634,011 | A | 5/1997 | Auerbach et al. |
| 6,230,200 | B1 | 5/2001 | Forecast |
| 6,633,772 | B2 | 10/2003 | Ford |
| 6,871,317 | B1 | 3/2005 | Corbett |
| 6,925,545 | B2 | 8/2005 | March |
| 7,177,951 | B1 | 2/2007 | Dykeman et al. |
| 7,499,907 | B2 | 3/2009 | Brown |
| 7,908,242 | B1 | 3/2011 | Achanta |
| 7,990,797 | B2 | 8/2011 | Moshayedi |
| 8,396,053 | B2 | 3/2013 | Giles |
| 8,407,322 | B1 | 3/2013 | Sasikumar |
| 9,384,200 | B1 | 7/2016 | Batchu |
| 9,841,908 | B1 | 12/2017 | Zhao |
| 9,842,024 | B1 | 12/2017 | David |
| 10,521,311 | B1 * | 12/2019 | Greenwood ........ G06F 11/1448 |
| 10,868,863 | B1 | 12/2020 | Kondiles |
| 2001/0051949 | A1 | 12/2001 | Carey |
| 2002/0010739 | A1 | 1/2002 | Ferris et al. |
| 2002/0032676 | A1 | 3/2002 | Reiner |
| 2004/0162853 | A1 | 8/2004 | Brodersen |
| 2006/0037075 | A1 | 2/2006 | Frattura |
| 2006/0075290 | A1 | 4/2006 | Hartline |
| 2006/0268742 | A1 | 11/2006 | Chu et al. |
| 2008/0065570 | A1 | 3/2008 | Schultz |
| 2008/0133456 | A1 | 6/2008 | Richards |
| 2009/0063893 | A1 | 3/2009 | Bagepalli |
| 2009/0077333 | A1 | 3/2009 | Byrne |
| 2009/0172191 | A1 | 7/2009 | Dumitriu et al. |
| 2009/0172244 | A1 | 7/2009 | Wang |
| 2009/0172464 | A1 | 7/2009 | Byrne |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0059978 | A1 | 3/2012 | Rosenband |
| 2012/0109888 | A1 | 5/2012 | Zhang et al. |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0054947 | A1 | 2/2013 | Gavrilov |
| 2013/0124463 | A1 * | 5/2013 | Lee .................. G06F 16/27 707/610 |
| 2013/0290249 | A1 | 10/2013 | Merriman |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0149530 | A1 | 5/2014 | Dietz |
| 2014/0188841 | A1 | 7/2014 | Sun |
| 2015/0039712 | A1 | 2/2015 | Frank et al. |
| 2015/0125133 | A1 | 5/2015 | Kim et al. |
| 2015/0135005 | A1 | 5/2015 | Hsu-Hung |
| 2015/0205607 | A1 | 7/2015 | Lindholm |
| 2015/0222444 | A1 | 8/2015 | Sarkar |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2016/0127200 | A1 | 5/2016 | Dippenaar |
| 2016/0301610 | A1 | 10/2016 | Amit |
| 2017/0139053 | A1 * | 5/2017 | Vishin .................. G01S 19/33 |
| 2018/0268044 | A1 | 9/2018 | Barber |
| 2019/0034505 | A1 | 1/2019 | Renauld |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. . com/blog/amazon-dynamodb-ten-thing.

An Inside Look at Google BigQuery, by Kazunori Sato, Solutions Architect, Cloud Solutions team, Google Inc., 2012.

Angskun T., Bosilca G., Dongarra J. (2007) Self-healing in Binomial Graph Networks. In: Meersman R., Tari Z., Herrero P. (eds) On the Move to Meaningful Internet Systems 2007: OTM 2007 Workshops. OTM 2007. Lecture Notes in Computer Science, vol. 4806. Springer, Berlin, Heidelberg.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

European Patent Office; extended European Search Report; EP Application No. 17882177.3; dated Aug. 20, 2020; 7 pgs.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Remote Direct Memory Access Transport for Remote Procedure Call, Internet Engineering Task Force (IETF), T. Talpey, Request for Comments: 5666, Category: Standards Track, ISSN: 2070-1721, Jan. 2010.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

T. Angskun, G. Bosilca, B. V. Zanden and J. Dongarra, Optimal Routing in Binomial Graph Networks, Eighth International Conference on Parallel and Distributed Computing, Applications and Technologies (PDCAT 2007), Adelaide, SA, 2007, pp. 363-370.

Cabrera, et al.; On Network Coded Distributed Storage: How to Repair in a Fog of Unreliable Peers; 2016 International Symposium on Wireless Communication Systems (ISWCS); IEEE; Sep. 20, 2016; pp. 188-193.

European Patent Office; Communication pursuant to Article 94(3) EPC; Application No. 17882177.3; dated Mar. 2, 2023; 7 pgs.

* cited by examiner

Events that Trigger Election of a New Designated Leader

| |
|---|
| 1) System Startup |
| 2) Verified failure of present designated leader |
| 3) Loss of connectivity with a majority of nodes in the cluster |

FIG. 6

Affected Coding Lines Sample Structure

| Starting Line | Ending Line | Parity Pattern |
|---|---|---|
| 16 Bytes | 16 Bytes | 2 Bytes |

FIG. 12

DATABASE MANAGEMENT SYSTEM WITH CODING CLUSTER AND METHODS FOR USE THEREWITH

CROSS-REFERENCE TO RELATED APPLICATIONS

The present U.S. Utility Patent Application claims priority pursuant to 35 U.S.C. § 120 as a continuation of U.S. Utility application Ser. No. 17/659,203, entitled "DATABASE SYSTEM WITH DESIGNATED LEADER AND METHODS FOR USE THEREWITH", filed Apr. 14, 2022, which is a continuation of U.S. Utility application Ser. No. 17/092,567, entitled "DATABASE MANAGEMENT SYSTEM AND METHODS FOR USE THEREWITH", filed Nov. 9, 2020, issued as U.S. Pat. No. 11,334,257 on May 17, 2022, which is a continuation of U.S. Utility application Ser. No. 15/840,633, entitled "SYSTEM AND METHOD FOR DESIGNATING A LEADER USING A CONSENSUS PROTOCOL WITHIN A DATABASE MANAGEMENT SYSTEM", filed Dec. 13, 2017, issued as U.S. Pat. No. 10,868,863 on Dec. 15, 2020, which claims priority pursuant to 35 U.S.C. § 119(e) to U.S. Provisional Application No. 62/433,919, entitled "USE OF A DESIGNATED LEADER TO MANAGE A CLUSTER OF NODES IN AN DATABASE MANAGEMENT SYSTEM", filed Dec. 14, 2016, all of which are hereby incorporated herein by reference in their entirety and made part of the present U.S. Utility Patent Application for all purposes.

This application is also related to U.S. Patent Application No. 62/403,231, entitled "HIGHLY PARALLEL DATABASE MANAGEMENT SYSTEM," filed on Oct. 3, 2016 in the name of George Kondiles, Rhett Colin Starr, Joseph Jablonski, and S. Christopher Gladwin, and assigned to Ocient Inc., and which is hereby included herein in its entirety by reference.

FIELD OF THE DISCLOSURE

The present disclosure generally relates to networked database management systems (DBMS) and supporting infrastructure. More particularly, the present disclosure relates to computer software application access to resources, such as memory and disk. More particularly still, the present disclosure relates to a system and method by which a database application maintains open lines, and more particularly still, the present disclosure relates to a system and method by which a governing node, referred to as a designated leader, can be elected using consensus protocol.

BACKGROUND

A DBMS is a suite of computer programs that are designed to manage a database, which is a large set of structured data. In particular, a DBMS is designed to quickly access and analyze data on large amounts of stored data. Most modern DBMS systems comprise multiple computers (nodes). The nodes generally communicate via a network, which will use a network protocol, such as HTTP, or raw TCP/IP. Information that is exchanged between nodes is exchanged by packets, the specific format of which will be determined by the specific protocol used by the network. The data wrapped in the packet will generally be compressed to the greatest extent possible to preserve network bandwidth. Accordingly, when it has been received, it will have to be formatted for use by the receiving node. A variety of DBMSs and the underlying infrastructure to support them are well known in the art. Database input/output ("I/O") systems comprise processes and threads that identify, read, and write blocks of data from storage; e.g., spinning magnetic disk drives, network storage, FLASH drives, or cloud storage.

Like many software systems, DBMS evolved from standalone computers, to sophisticated client/server setups, to cloud systems. An example of a cloud based DBMS is depicted in FIG. 1. In particular, a cloud system 2 will generally comprise a variety of nodes (computers) as well as software that operates on the nodes. The cloud system 2 will comprise numerous separate nodes, including multiple database servers 1. Each database server will maintain separate storage (not depicted), which will store some part of the maintained data. Various clients can access the cloud system 2 through the Internet 4. Clients can include, for example, a standard desktop or laptop computer 6, a mobile device 7, as well as various sensors 8 and control equipment 9.

Generally, DBMSs operate on computer systems (whether standalone, client/server, or cloud) that incorporate operating systems. Operating systems, which are usually designed to work across a wide variety of hardware, utilize device drivers to abstract the particular functions of hardware components, such as, for example, disk controllers, and network interface cards. As drivers are generally accessed through an operating system, such accesses will typically entail significant resource overhead such as a mode switch; i.e., a switch from executing application logic to operating system logic, or a context switch; i.e., the pausing of one task to perform another. Such switches are typically time consuming; sometimes on the order of milliseconds of processor time.

Data stored in a DBMS is usually stored redundantly, using, for example, a RAID controller, Storage Area Network ("SAN") system, or dispersed data storage. For example, using prior art RAID techniques, data may be split into blocks and to ensure that data is recovered; and one or more nodes within a coding line can maintain parity. For example, for a sixteen node system, twelve nodes may store data blocks, while four nodes would store parity blocks. Other data/parity configurations, such as thirteen and three, or ten and six, could be used, and parity can be determined using any of the well-known prior art techniques.

A DBMS system must maintain a record of storage that has not yet been utilized. Slow speed databases can make use of the operating system to manage open storage. However, high speed databases need to maintain their own list of open storage. In addition, such databases need to utilize a method to determine when to recycle storage that had been in use, but is no longer in use.

A fundamental problem in distributed computing and multi-agent systems is to achieve overall system reliability in the presence of a number of faulty processes. This often requires processes to agree on some data value that is needed during computation. Examples of applications of consensus include whether to commit a transaction to a database, or agreeing on the identity of a leader. There are a number of such methods of agreement that are well known in the prior art.

OBJECTS OF THE DISCLOSED SYSTEM, METHOD, AND APPARATUS

Accordingly, it is an object of this disclosure to provide a new and improved system and method for maintaining a list of open coding lines within a DBMS;

Another object of the disclosure is to provide an improved DBMS that utilizes a designated leader to manage a list of open coding lines;

Another object of the disclosure is to provide an improved DBMS that utilizes a parity pattern assigned by a designated leader to manage parity nodes;

Another object of the disclosure is to provide an improved DBMS that utilizes a designated leader to modify the parity pattern on a coding line to coding line basis;

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

A networked database management system along with the supporting infrastructure is disclosed. The disclosed DBMS comprises a plurality of nodes, one of which is elected as a designated leader using a consensus algorithm. Under various circumstances, a new election of a designated leader takes place. For example, on system startup or when the previous designated leader experiences a verified failure. In addition, the designated leader is responsible for managing open coding lines; i.e., coding lines that have not been completely filled with data. The designated leader determines when a coding line is to be closed; i.e., it cannot hold more data, and should be flushed to disk if needed; NVRAM systems will not require this step.

In particular, a database management system comprising three or more nodes is disclosed. Each of the nodes comprises a network interface to allow the node to communicate with other nodes, and other devices, such as administration consoles. A high-speed switch is coupled to the network interface of each of the nodes, and allows the nodes to communicate with one another (and other devices). There are various circumstances wherein the nodes will utilize a consensus algorithm to elect a designated leader. On startup, all of the nodes will participate to elect a designated leader. Similarly, when a majority of nodes lose contact with the designated leader, the nodes that are not the designated leader cooperate to elect a new designated leader. In addition, when there is a verified failure of the designated leader, the nodes that are not the designated leader cooperate to elect a new designated leader. In all cases, the electing nodes utilize a consensus protocol such as RAFT or PAXOS (although in the case of RAFT, the election of the leader is actually part of the protocol).

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 6 is a table listing representative events that can cause a new election for a designated leader to be determined in accordance with this disclosure.

FIG. 12 is a representative data structure for holding an exception list as constructed in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
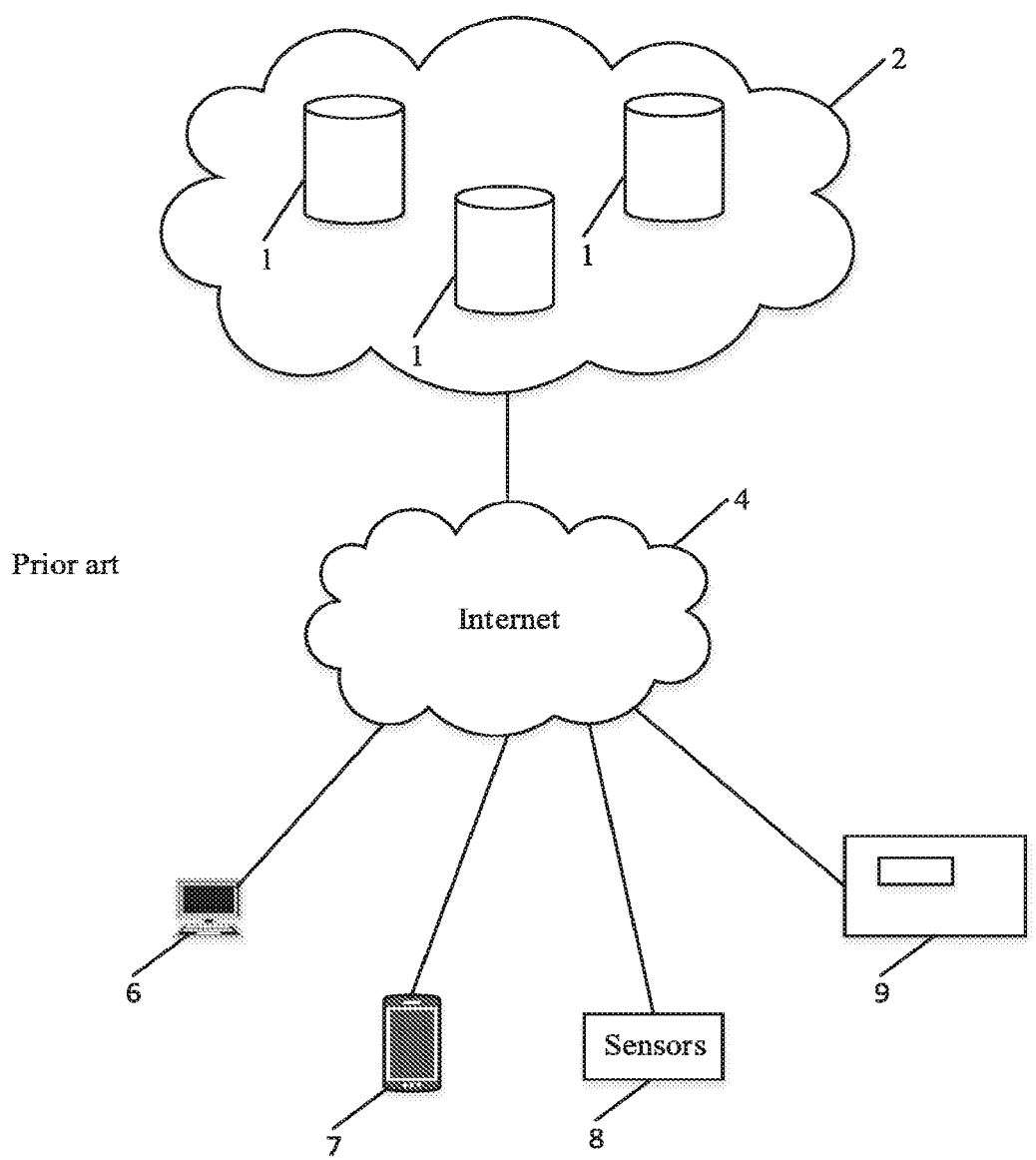
FIG. 1 depicts a prior art simplified network diagram of a cloud based DBMS system.
Figure 2:
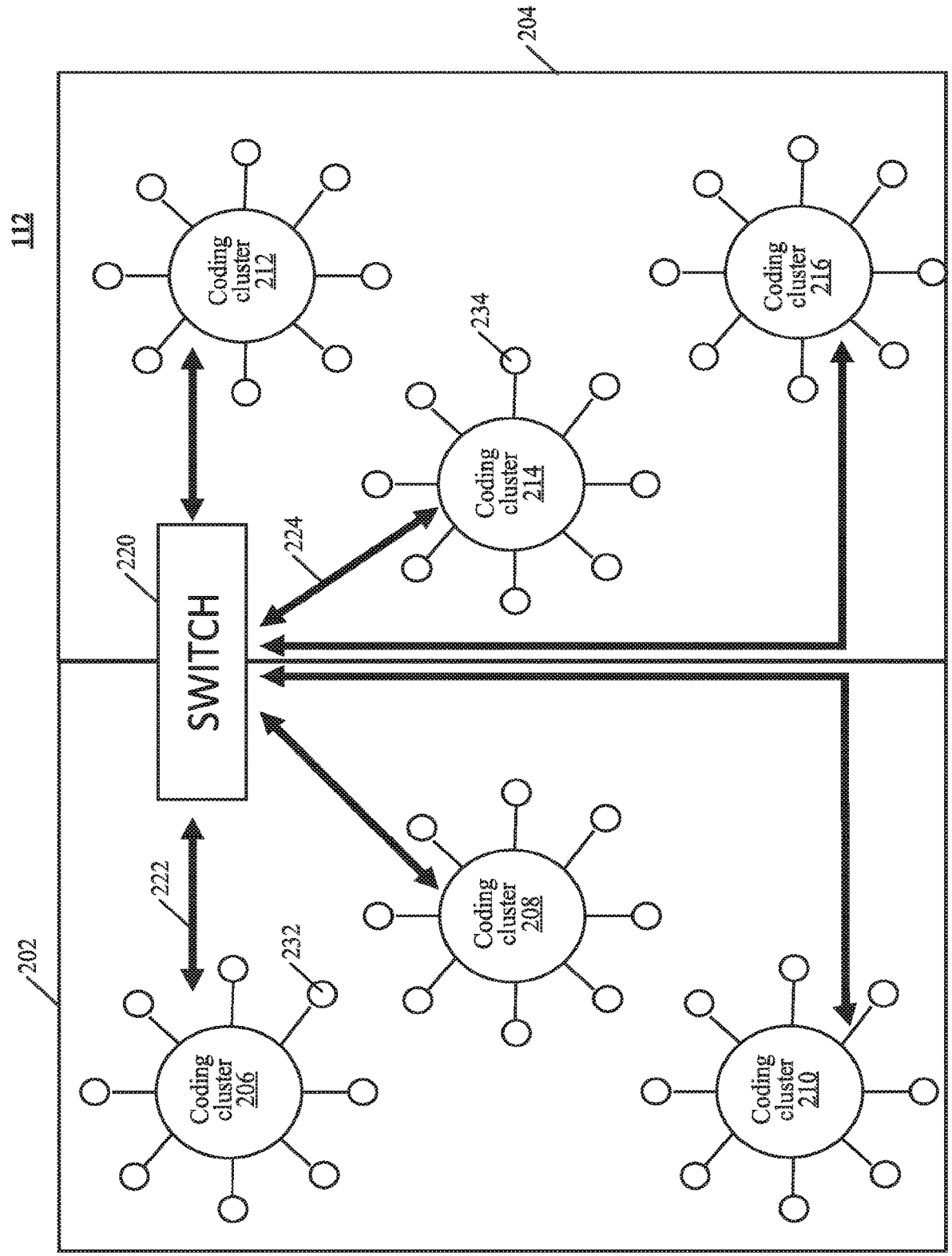
FIG. 2 is a simplified block diagram illustrating a database system in accordance with this disclosure.

Turning to the Figures, and to FIG. 2 in particular a simplified block diagram illustrating the database system 112 is shown. The database system 112 includes a payload store 202 for storing and serving data and an index store 204 for storing and managing indexes for accessing the data stored payload store 202. The payload store 202 includes a set of coding clusters 206, 208 and 210 for storing data and serving data to computer software applications, such as applications running on client computers.

Each coding cluster includes a number of nodes, such as the nodes 232 and 234. In one implementation, the coding clusters each have the same number of nodes. For example, the number of nodes is five (5) in each cluster. Each node includes one or more storage devices, such as Non-Volatile Memory Express (NVME) and Serial Advanced Technology Attachment (SATA) storage devices. Nodes within a coding cluster are connected through high speed links. In other words, each cluster has local high-speed-interconnect (HSI), such as Infiniband, via a switch. The clusters are connected to each other through a switch 220 via high speed links, such as the links 222 and 224. The links between the clusters are high-speed-interconnects, such as Infiniband or iWarp.

Figure 3:
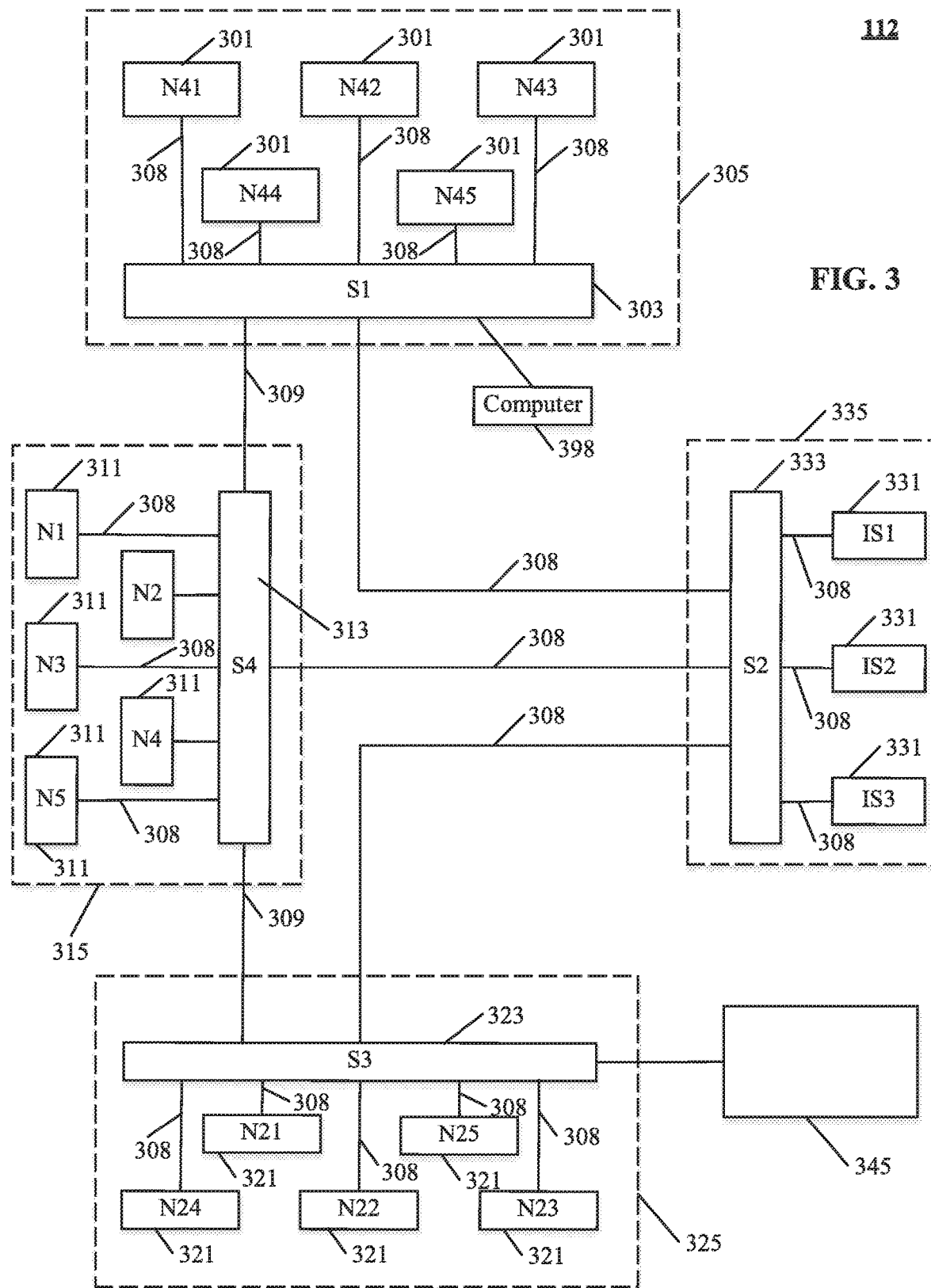
FIG. 3 is a simplified block diagram illustrating a high-performance database system constructed in accordance with this disclosure.

Referring now to FIG. 3, an illustrative embodiment of the high-performance database system 112 is shown. Three coding clusters of a payload store are indicated at 305, 315 and 325 respectively. A coding cluster of the index store 204 is indicated at 335. In the illustrative database system 112, the clusters 305, 315 and 325 each include exactly five nodes indicated at 301, 311 and 321 respectively in the illustrative embodiment. The cluster 305 is a blazing storage cluster; the cluster 315 is a hot storage cluster; and the cluster 325 is a warm storage cluster. In a further implementation, the database system includes or communicates with a cold cluster 345. As used herein, blazing, hot, warm and cold indicate data temperature that corresponds to the expected access rate of the data. For example, the age of the data measured in days in a system where newer data is expected to be accessed more frequently. For instance, blazing indicates that data is less than X days old, hot indicates that data is less than Y days old and older than data in blazing clusters, warm indicates that data is less than Z days old and older than data in hot clusters, and cold indicates that data is at least Z days old. Z is bigger than Y while Y is bigger than X. For example, X is seven; Y is twenty-one; and Z is forty-two.

The links 308 and 309 are capable of remote direct memory access (RDMA). In particular, the index cluster 335 is connected to the storage clusters 305, 315, 325 by high speed, RDMA capable links 308. On the other hand, the storage clusters 305, 315, 325 are connected to one another by standard (non-RDMA capable) high performance network links 309, such as 100 Gbps Ethernet. Nodes within a cluster are linked using HSI 308, such as Infiniband or iWarp Ethernet. Switches 303, 313, 323 and 333 interconnect the clusters 305, 315, 325 and 335 over HSI 309 and HIS 308, such as 100 GB Ethernet. As discussed above, Infiniband, iWARP Ethernet, RoCE Ethernet and Omnipath are examples of high speed, RDMA capable links. Importantly, such links allow different nodes in each cluster to exchange information rapidly; as discussed above, information from one node is inserted into the memory of another node without consuming processor cycles on either node.

The blazing storage node 305 may include, for example, an array of Non-Volatile Dual Inline Memory Module (NVDIMM) storage, such as that marketed by Hewlett Packard Enterprise, or any other extremely fast storage, along with appropriate controllers to allow for full speed access to such storage. In one implementation, the storage is Apache Pass NVRAM storage. The hot storage node 313 may include, for example, one or more Solid State NVME drives, along with appropriate controllers to allow for full speed access to such storage. The warm storage node 323 may include, for example, one or more Solid State SATA drives, along with appropriate controllers to allow for full speed access to such storage.

Each index node 331 will also include storage, which will generally comprise high performance storage such as Solid State SATA drives or higher performance storage devices. Generally, the index nodes 331 will store the database structure itself, which may comprise, for example, a collection of indexes and other data for locating a particular piece of data on a storage drive in a node within the payload store.

The blazing storage cluster 305 also comprises a high-speed switch 303. Each blazing storage node 301 is operatively coupled to the high-speed switch 303 through a high speed, RDMA capable link 308. Similarly, each hot storage node 311 is coupled to a high-speed switch 313 through a high speed, RDMA capable, link 308, and each warm storage node 321 is coupled to the high-speed switch 323 through a high speed, RDMA capable, link 308. Similarly, the high-speed switches 303, 313, 323 are coupled to each storage cluster 305, 315, 325 are each coupled to the high-speed switch 333 of the index cluster 335 by a high speed, RDMA capable, link 308.

Figure 4:
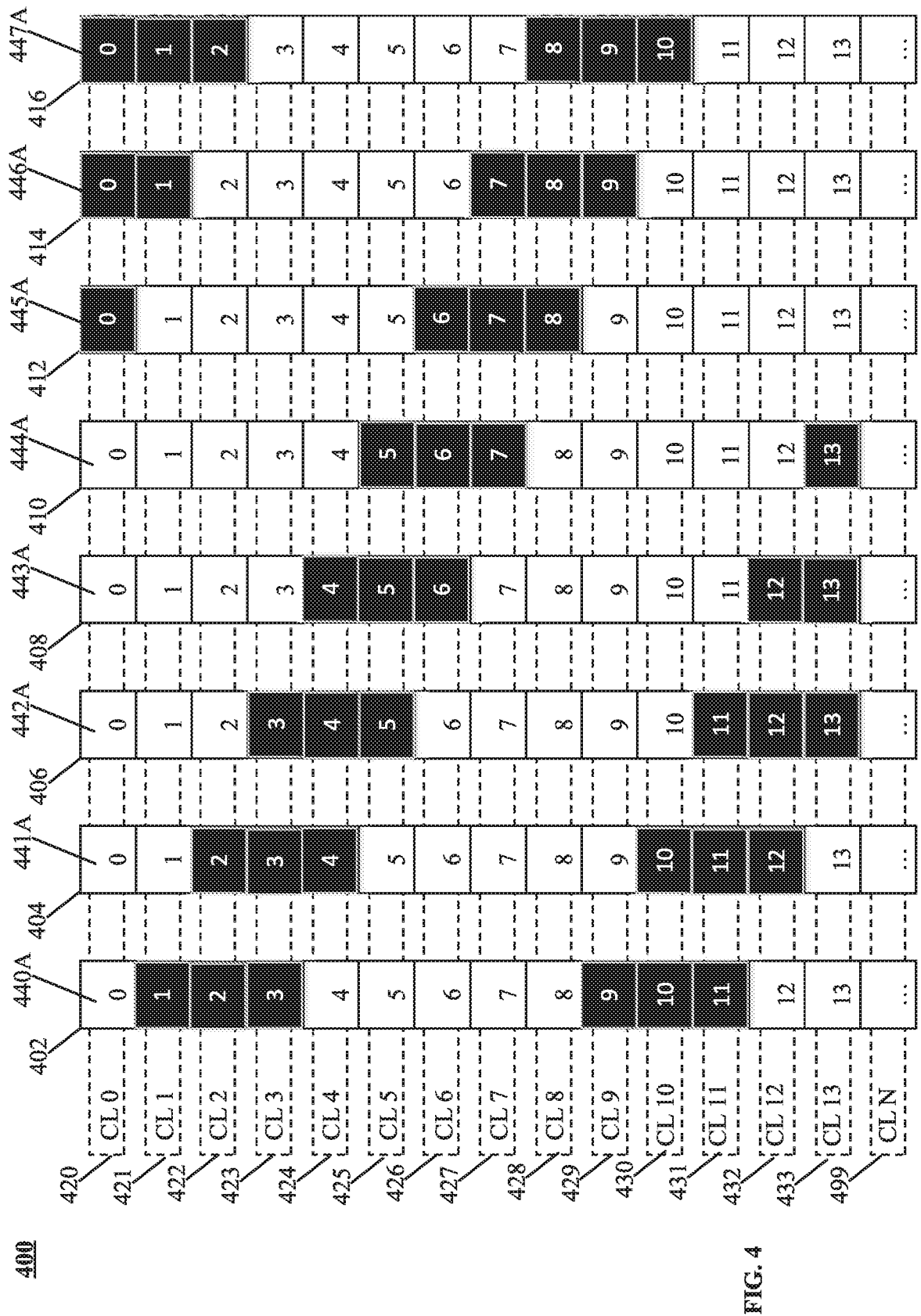
FIG. 4 is a simplified block diagram illustrating a segment group constructed in accordance with this disclosure.

Turning to FIG. 4, a collection of open coding lines is depicted. From left to right, a number of segments 402, 404, 406, 408, 410, 412, 414, and 416 are depicted. As depicted, each segment 402 [ . . . ] 416 is stored on a separate node, although a node can hold multiple segments depending on disk allocation; nonetheless, for purposes of this application, only a single segment from a given node is represented in a coding line. From top to bottom, a number of coding lines 420, 421, 422, 423, 424, 425, 426, 427, 428, 429, 430, 431, 432, 433, 499 are depicted. Each coding line comprises a collection of related data. As depicted, each coding line comprises (from left to right) a number of coding blocks 440A, 441A, 442A, 443A, 444A, 445A, 446A, 447A, each of which holds related data. Strictly for purposes of illustration, a coding block can be, for example, 4 kilobytes (KB) or 8 KB, which are typical page sizes of non-volatile FLASH memory, while a segment can be, for example, 1 terabyte (TB), which is a typical size of a solid-state drive. The sizes of a coding block and of a segment can, of course, be arbitrary, and are not limitations of this disclosure.

An open coding line is a coding line where at least one segment has at least one open coding block. A DBMS must maintain at least one open coding line at all times to accommodate various transactions, such as storage transactions. More advantageously, the DBMS will strive to maintain a minimum number of open coding lines so that every node in the cluster (and accordingly each segment) maintains at least one open coding block. However, meeting such a goal requires coordination between the nodes or a controlling entity. The latter solution is simpler, but creates an additional problem; namely, if the controlling entity goes off line, how are its responsibilities transitioned to another entity?

The disclosed system solves this problem by utilizing a designated leader that is elected by a consensus protocol. In particular, the nodes cooperatively determine which among their members shall act as the designated leader for that particular cluster. Once the designated leader is determined, it is responsible for ensuring, among other things, that at least one coding block on each node is open so that a minimum number of open lines can be maintained.

Figure 5:
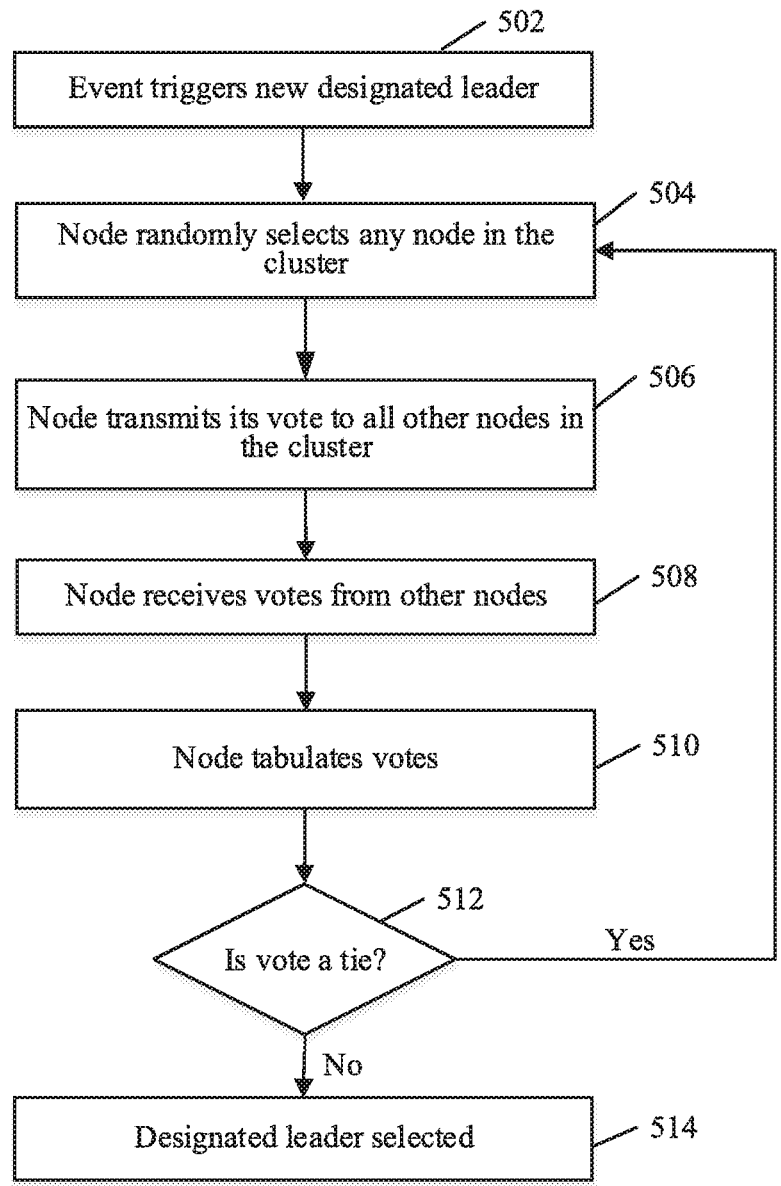
FIG. 5 is a simplified flowchart illustrating a process for electing a designated leader in accordance with this disclosure.

There are numerous potential algorithms that the nodes within a cluster can utilize to determine a designated leader, any of which can be used. For purposes of education, however, one simple consensus algorithm that could be used would be for each node to randomly vote for any node in the cluster, exchange those votes, and for the node with the most votes to be elected designated leader. In the case of ties, a revote is triggered. A simplified flowchart illustrating this process as executed by a node is depicted in FIG. 5. Other well-known consensus protocols, such as RAFT and PAXOS could be used as well.

In a first step 502, an event triggers the selection of a new designated leader. A listing of such events is depicted in the table of FIG. 6. In step 504, the node randomly selects any node (including itself) as its vote for a designated leader. In step 506, the node transmits its vote to all other nodes in the cluster. In step 508, the node receives votes from other nodes in the cluster. In step 510, the node tabulates the votes from all nodes, including itself. In step 512, the node determines if the vote is a tie. If so, the process returns to step 504. Otherwise, the process has determined the designated leader, which is selected in step 514. The process of FIG. 5 is executed by all nodes in the cluster.

Table 6 lists a number of events by which a new designated leader will be elected. In particular, these events include 1) system startup, 2) a verified failure of the present designated leader, and 3) a loss of connectivity with a majority of nodes in the cluster. These events are merely representative, and unless claimed, are not intended as limitations of the disclosed DBMS.

Generally, the designated leader does not interfere with the insert (storage) process. In particular, when a client wishes to store a block of data, it uploads the data to the DBMS. A cluster then receives the data for writing on to a disk drive. In one implementation, a data distributor (such as the computer 398 of the cluster 305) distributes the block of data to a node within the cluster. The distribution is random such that data is evenly distributed between nodes within the cluster. The node receiving the data inserts the data into one or more open coding blocks. The node then copies the newly inserted data to all nodes that store parity for the coding line. If, at the time that the client seeks to store data there are no open coding lines, the node that the client reached out to will request that the designated leader open a new coding line. The designated leader will then open a predetermined number of coding lines, and the data will be stored as outlined herein.

Figure 7:
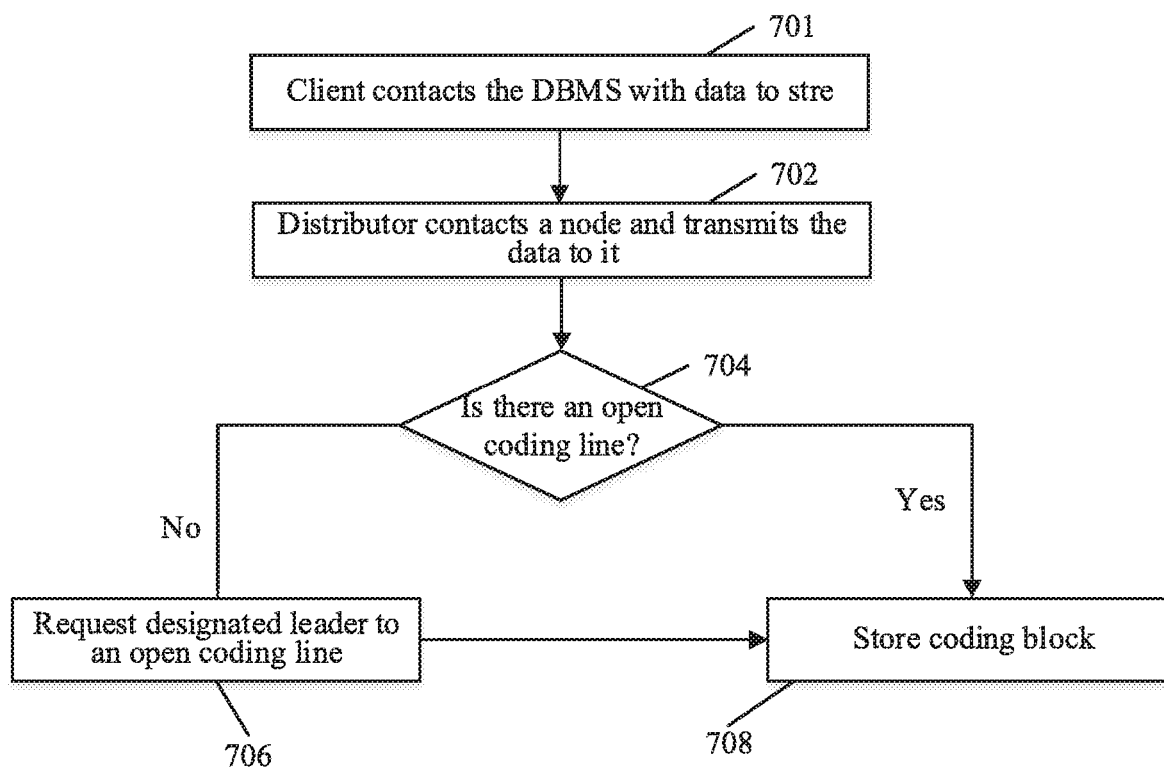
FIG. 7 is a simplified flowchart illustrating how data is stored in a coding block in accordance with this disclosure.

A flowchart illustrating this process is depicted in FIG. 7. In step 701, a client contacts the DBMS with data to store. In step 702, a distributor within the DBMS contacts a node within a DBMS' cluster and transmits the data to store to it. In step 704, the node checks whether there are any open coding lines. If there is not, in step 706 the node requests that the designated leader open additional coding lines. After either step 704 (if there is an open coding line) or after step 706 (after the designated leader opens a coding line) the node then stores the coding block. In step 708, the node then transmits the inserted data to all parity nodes for the coding line that the data is stored in.

The designated leader also tracks when a coding line is to be closed. In particular, each node will notify the designated leader when it has completed filling in a data coding block. After notifying the designated leader the node then flushes the coding block from memory to disk. The designated leader then notifies the parity peers for the coding line. The parity peers then 1) compute parity, 2) store the computed parity to disk, and 3) purge their copy of any coding blocks that they computed parity for.

Figure 8:
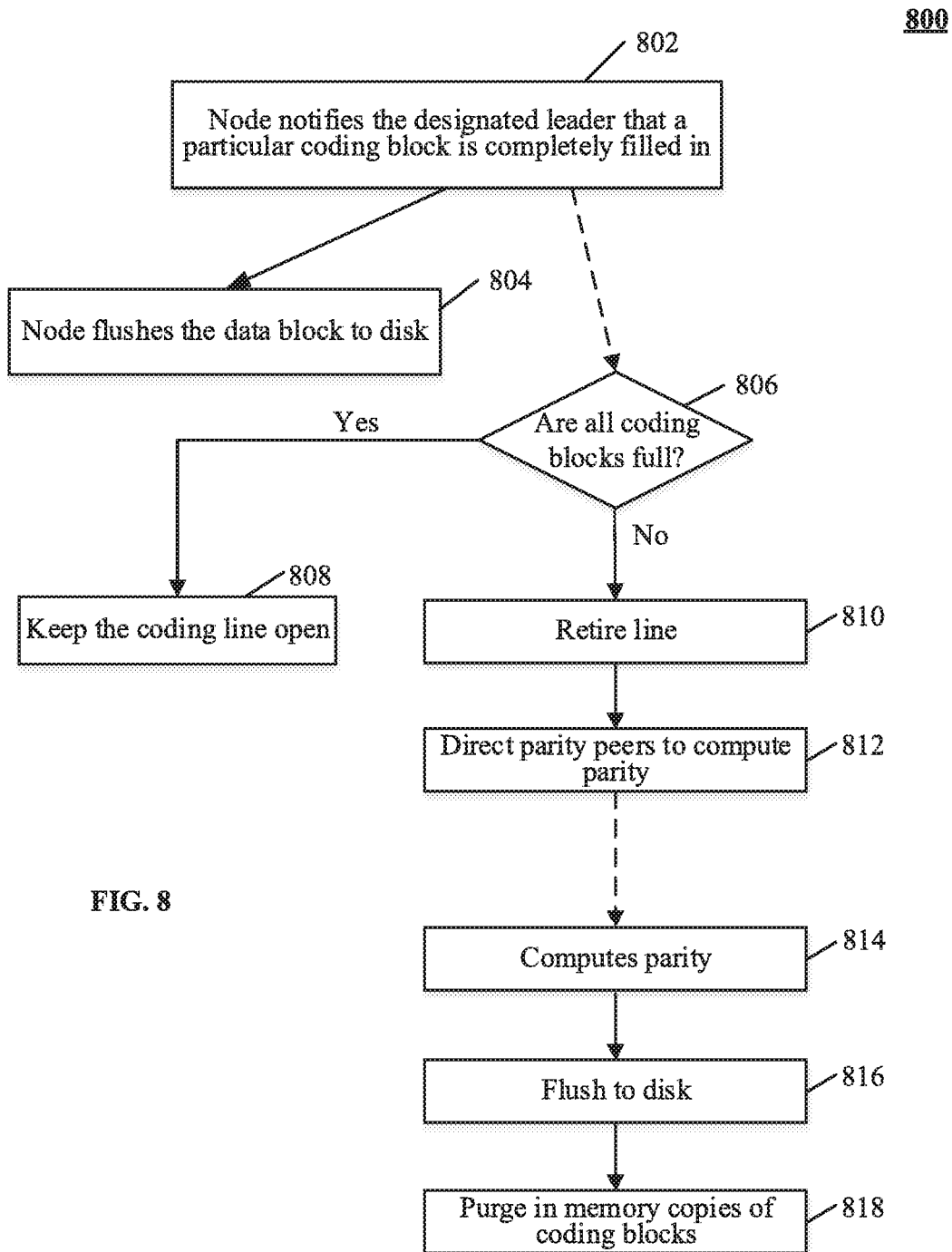
FIG. 8 is a simplified flowchart illustrating how nodes, the designated leader, and parity peers cooperate to store data in accordance with this disclosure.

A flowchart illustrating this process is depicted in FIG. 8. In step 802, a node notifies the designated leader that a particular coding block is completely full. The node then flushes the coding block to disk (if necessary) in step 804—it should be noted that in certain NVRAM embodiments, there is no need to flush to disk. Transitioning to the designated leader, after being notified by a node that a particular coding block is entirely full, the designated leader checks if all coding blocks in a coding line are full in step 806. If all coding blocks in a coding line are not full, the designated leader leaves the coding line open in step 808. However, if all coding blocks in a coding line are full, the designated leader retires the coding line in step 810. Then, in step 812, the designated leader directs the parity peers for the coding line to compute parity. In step 814, each parity peer then computes parity, which is flushed to disk (if necessary) in step 816. In step 818, each parity peer then purges its in-memory copies of the coding blocks for which it computed parity.

One advantage of this approach is that it allows for disk writes to be made sequentially; i.e., blocks with sequential addresses can be written together. For example, coding blocks, which can be sized to be the same as a FLASH page, within a FLASH memory block can be written simultaneously so that only a single erase and write are required. This improves FLASH memory durability substantially.

In addition, by allowing the designated leader to manage open lines, storage across nodes, as well as work load across nodes, can be balanced. For example, when a line is retired, all nodes will store at least one coding block. This also serves to minimize write amplification, as writes are done only as required.

In addition, another aspect of this disclosure defines a method by which a designated leader can manage the assignment of parity peers to open coding lines. In particular, the designated leader serves to distribute parity peer responsibility across all nodes in a cluster so that certain nodes are not exclusively responsible for parity while other nodes are responsible only for storing data. This improves the overall reliability and robustness of the DBMS.

In particular, the designated leader will decide on a parity pattern for the cluster. As described earlier, parity peers are logically adjacent in the coding lines, and the order of all nodes in coding lines is identical across all coding lines managed by a designated leader. The designated leader rotates parity across all nodes on a fixed basis. In particular, as a collection of coding lines is traversed, one parity peer is shifted to the right or left by a fixed number of nodes.

Figure 9:
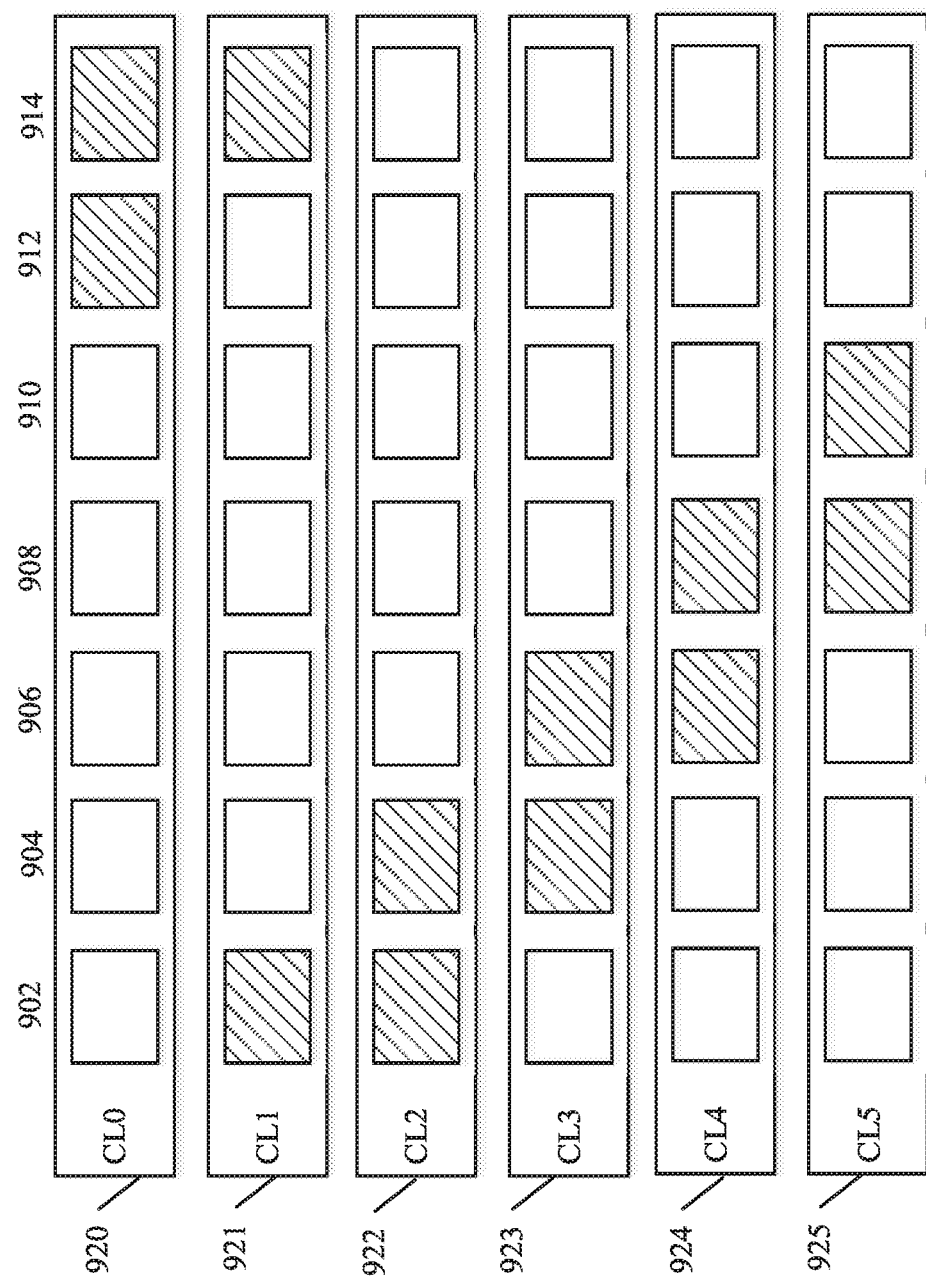
FIG. 9 is a simplified block diagram illustrating a representative parity rotation pattern for a database system constructed in accordance with this disclosure.

Parity rotation as discussed above with a rotation constant of 1 is illustrated in FIG. 9. Horizontally, seven nodes are depicted and are labeled as 902, 904, 906, 908, 910, 912, and 914. A total of six coding lines arranged vertically are labeled as CL0-CL5 and designated 920, 921, 922, 923, 924, and 925. As depicted, each coding line includes five data nodes and two parity peers, with the data nodes being depicted without hatching, and the parity peers being depicted with hatching. As depicted, as the coding lines are traversed downwards from CL0, parity shifts one position to the right. For example, for CL0, nodes 912 and 914 are designated as parity peers. For CL1, parity shifts one position to the right, so nodes 914 and 902 are designated as parity peers. For CL2, nodes 902 and 904 are designated as parity peers. The same pattern continues for CL3-CL5. In such a case, the parity rotation is said to have a rotation constant of 1.

Figure 10:
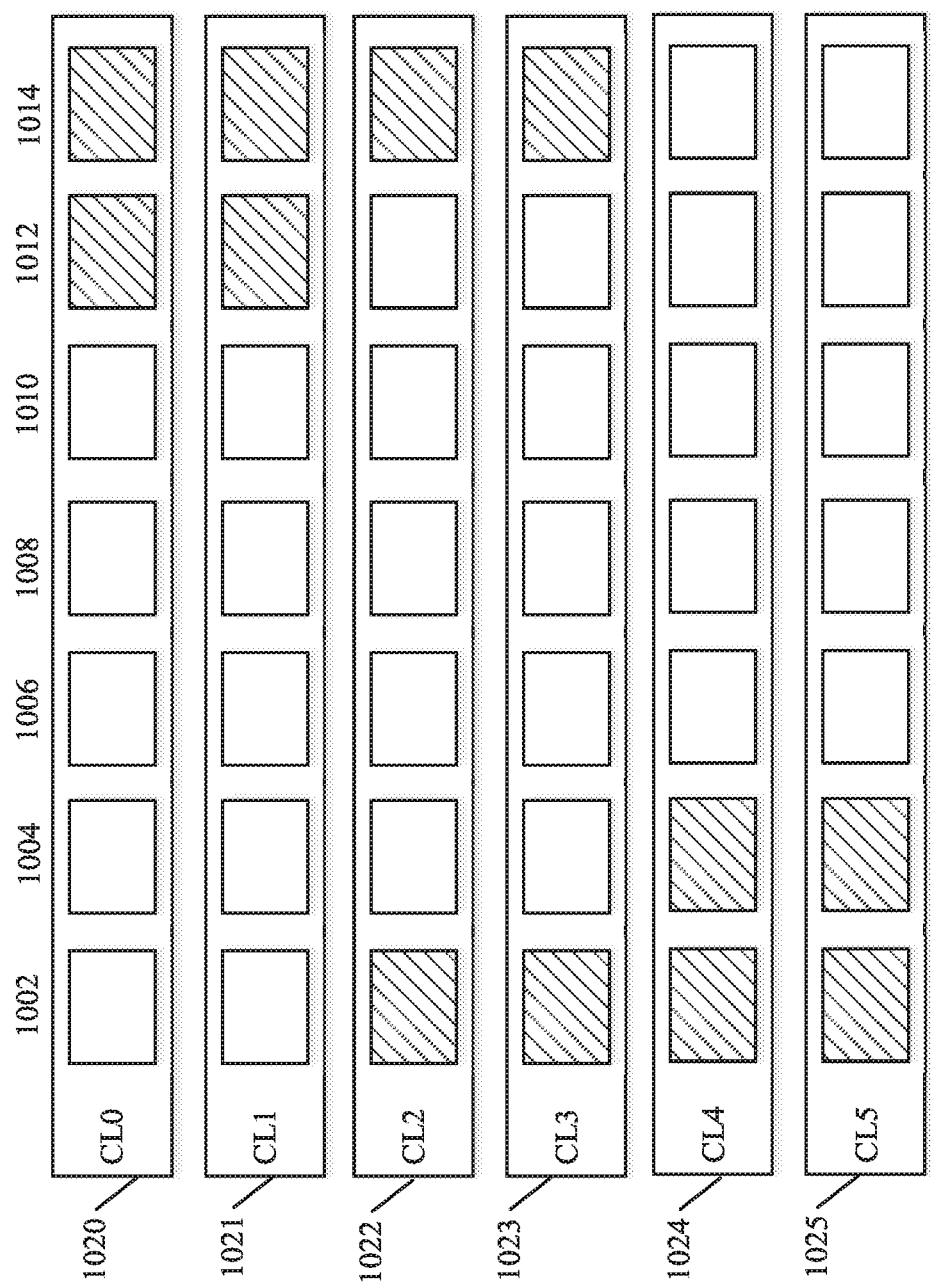
FIG. 10 is a simplified block diagram illustrating a representative parity rotation pattern for a database system constructed in accordance with this disclosure.

FIG. 10 depicts parity rotation with a rotation constant of 2. In particular, seven nodes are depicted and labeled as 1002, 1004, 1006, 1008, 1010, 1012, and 1014. A total of six coding lines arranged vertically are labeled as CL0-CL5 and designated 1020, 1021, 1022, 1023, 1024, and 1025. As depicted, each coding line again includes five data nodes and two parity peers, with parity peers again being demarcated with hatching. Again, parity shifts as the coding lines are traversed vertically. In particular, CL0 has two nodes serving as parity peers, 1012 and 1014, and CL1 has the same parity peers. However, the parity peers shift one to the right for CL2, which has designated as parity peers nodes 1014 and

1002. Again, CL3 has the same parity peers as the preceding line (CL2). For CL4 and CL5, nodes 1002 and 1004 function as parity peers; i.e., the parity peers shift one to the right for every two nodes.

Figure 11:
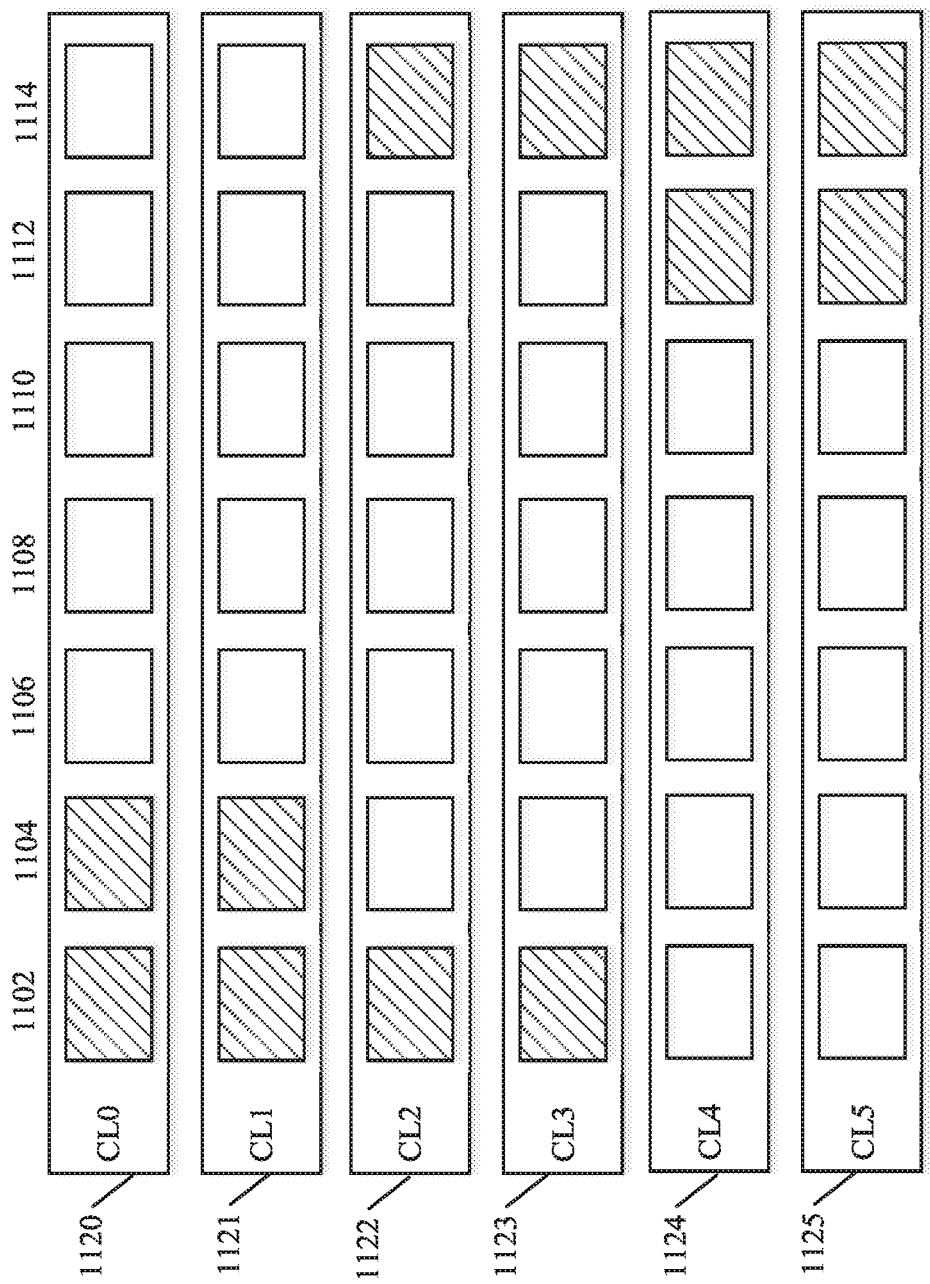
FIG. 11 is a simplified block diagram illustrating a representative parity rotation pattern for a database system constructed in accordance with this disclosure.

Any integer rotation constant can be used; i.e., for a rotation constant of 3, the parity peers will change every three lines. In addition, while parity is depicted as rotating to the right, it can rotate to the left just as easily, as depicted in FIG. 11 for a rotation constant of 2. In addition, other rotations could be used as well as long as the rotation is deterministic. For example, a pseudo-random number generation function could be used to generate a deterministic parity rotation for this purpose.

The designated leader determines the parity rotation pattern for the cluster. If there are no exceptions (as discussed below), a particular block can be located with the following information:

A) The parity pattern (i.e., whether parity nodes are stored on logically adjacent nodes, whether they are separated by one, etc.);

B) The coding line offset;

C) The IDA offset;

D) The parity rotation constant; and

E) The number of data and parity nodes.

However, given real world circumstances, nodes can be expected to fail for a variety of reasons, ranging from a temporary loss of network connectivity to a complete system failure. When a node fails, the data or parity that it stores needs to be reassigned to a different node.

The disclosed DBMS resolves this issue with an exception list, which may also be referred to herein as an exception table. In particular, when a node is not able to perform its function to store either data or parity for a particular coding line, an exception is generated and stored in the exception list. An example of an exception list is shown in FIG. 12. In a separate embodiment, an exception is only generated if a node storing data becomes non-functional.

In particular, an exception table can include an arbitrary number of entries, each of which will include a starting coding line, an ending coding line, and an updated parity pattern. The starting coding line stores the first coding line on which there is at least one down node. The ending coding line stores the last coding line in a range of coding lines on which there is at least one down node. A range of represented coding lines can be any non-zero whole number of coding lines; i.e.; one or greater. The parity pattern stores the parity pattern for the affected lines; i.e., for the affected lines, the nodes in the affected lines which store parity in view of the affected node(s). As depicted, the starting and ending coding line will occupy 16 bytes, while the updated parity pattern, assuming a seven-node system with two parity peers and five data nodes, will utilize two bytes.

Figure 13:
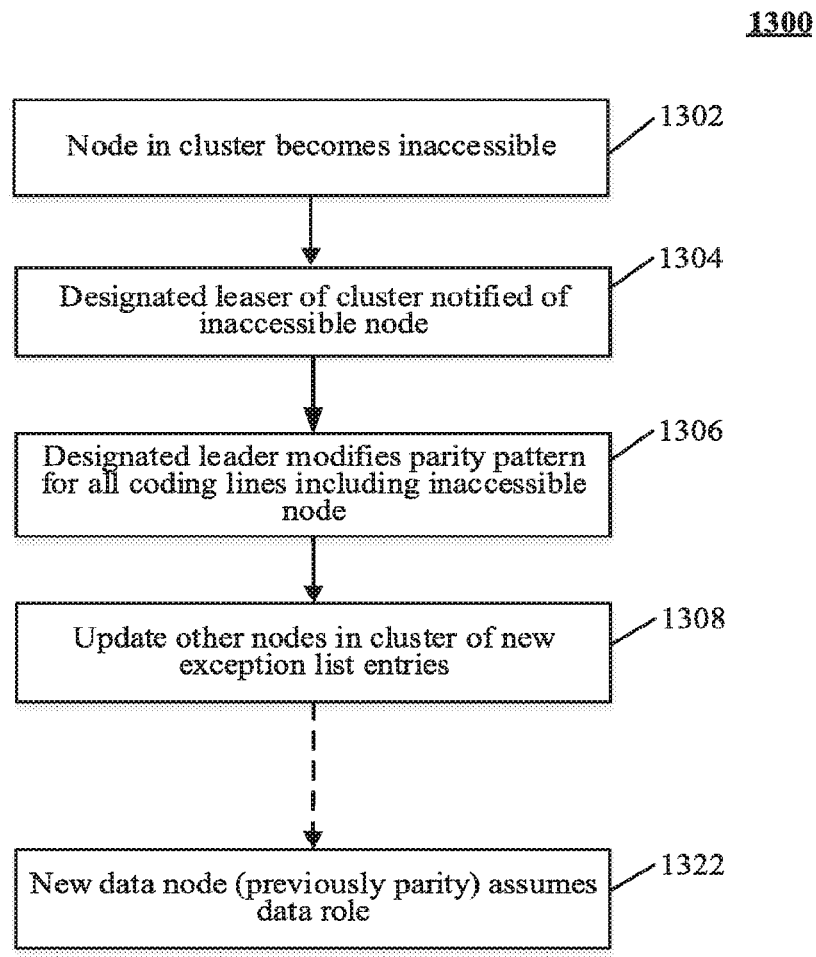
FIG. 13 is a simplified flow chart illustrating a process by which an entry in an exception table can be created in accordance with this disclosure.

The process of creating an entry in the exception table is illustrated in FIG. 13. In particular, in step 1302, a node in the cluster notices that a node is not accessible. In step 1304, the node notifies the designated leader of the down node. In step 1306, the designated leader modifies the parity pattern for all open coding lines including the inaccessible node and stores the updated parity pattern for the affected coding lines in its exception table. The designated leader then sends an update to the exception table to other nodes in step 1308. If new coding lines are opened prior to the inaccessible node being returned to service, the new coding lines are also given the new parity pattern. The update sent in step 1308 will modify the role of a previous parity node to become a data node. In step 1322, the new data node assumes its role; as all data to be stored in the line would have already been transmitted to the node in its previous role as a parity node, it can seamlessly assume its role as a data node storing the data assigned to it by the parity pattern; i.e., the data assigned to the newly designated storage node will already be stored in the node's memory. Note, the data designated to the parity node will generally not be flushed to persistent storage until the line is closed, unless the underlying storage is an NVRAM embodiment, in which case, no express storage to persistent storage would be required. As explained more thoroughly in application No. 62/403,231, which was previously incorporated by reference into this application, data can transition between storage temperatures. In particular, a segment group can be copied from, for example, blazing storage, to, for example, hot storage, where a segment group is a number of related segments, such as a collection of drives within a cluster, with each drive residing on a different node. It is advantageous to clear the exception list when data is transferred.

Clearing the exception list is easily done during the process of copying the data from one storage temperature to another storage temperate. When a particular block is transitioned between storage temperatures, the original (non-excepted) parity pattern is restored. As all nodes are aware of the default parity pattern, and the exception list, this is accomplished by the node that holds data, which, without the exception, would be stored on a different node, transmitting the affected data to the node designated by the default parity pattern when the data transitions between storage temperatures.

Figure 14:
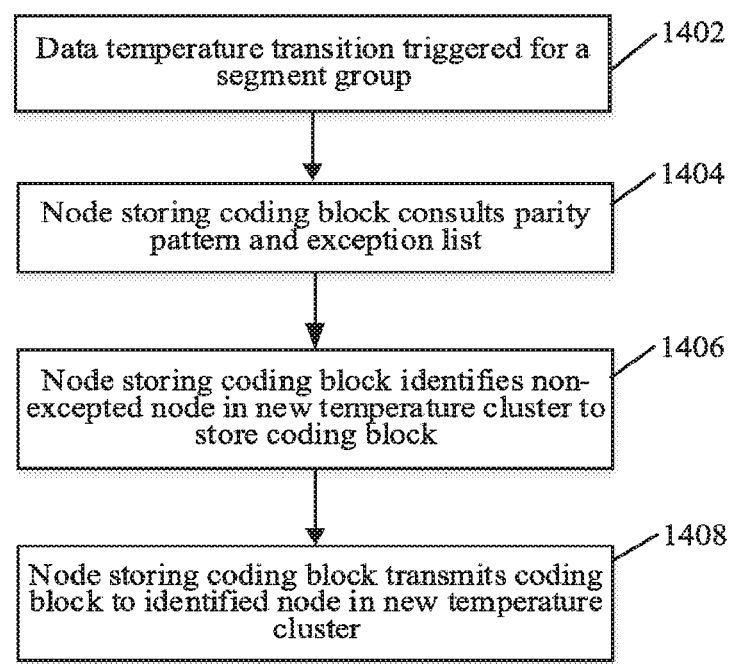
FIG. 14 is a simplified flow chart illustrating a process by which an exception table is cleared when a segment group is transitioned from one storage temperature to another in accordance with this disclosure.

This process is illustrated in FIG. 14. In step 1402, a temperature transition is triggered for a particular segment group. Once a segment group is scheduled for transition, the following process is repeated for every coding block of every segment within the segment group. In step 1404, a node storing a coding block consults the default parity pattern and the exception list. Then, in step 1406, the node storing the coding block identifies the non-excepted node in the new temperature cluster that is to store the coding block. For example, if the data is not excepted, then the node holding the coding block will identify its corresponding node in the new temperature cluster; however, if the data is excepted, than the node will consult the original parity pattern and identify the node that the data would have been stored on without the exception, and identify the node corresponding to the original parity pattern in the new temperature cluster. Finally, in step 1408, the node storing the coding block transmits the coding block to the identified node in the new temperature cluster.

Each node in the cluster will maintain a copy of the exception table, which will need to be referenced when data is accessed. Accordingly, for a fully robust system, the following information would be required to locate a particular stored block.

A) The parity pattern (i.e., whether parity nodes are stored on logically adjacent nodes, whether they are separated by one, etc.);

B) The coding line offset;

C) The IDA offset;

D) The parity rotation constant;

E) The number of data and parity nodes; and

F) The exception table.

It should be noted that the DBMS must reject new data stores if more nodes become accessible than there are parity nodes for a particular system. Accordingly, if a particular data store is configured for five data nodes and two parity peers, the data store will not be able to accept more data if more than two nodes become inaccessible.

Another important function of the disclosed DBMS is to collect and aggregate certain information that is related to runtime statistics, utilization and operation of the DBMS. For example, a non-exhaustive list of tracked statistics would be percent of storage utilized, amount of data read in a last time unit (such as 1 second), the amount of data written in a last time unit (again, 1 second would be typical), the total data rate (data read plus data written) in a last time unit (such as 1 second), number of input transactions (reads) in a last time unit (such as 1 second), number of output transactions (writes) in a last time unit (such as 1 second), and the total transaction count (reads plus writes) in a last time unit (such as 1 second). While statistics such as these are tracked on a per node basis, the goal of the disclosed system is to aggregate the required data, including the calculation of any higher order quantities, across a fixed grouping of nodes only one time so that there are no duplicates or wasted processor resources. Such fixed groupings of nodes include, but are not limited to, individual clusters of nodes, or sets of nodes storing data for a particular database table.

Accordingly, the designated leader of a particular group of nodes (cluster) is assigned the task of performing data collection and aggregation (including calculation of higher order values) for a particular cluster or table. In particular, the designated leader is responsible for assigning a node or nodes to aggregate data from a particular group of other nodes. If an assigned node goes down, the designated leader is responsible for designating a replacement.

Figure 15:
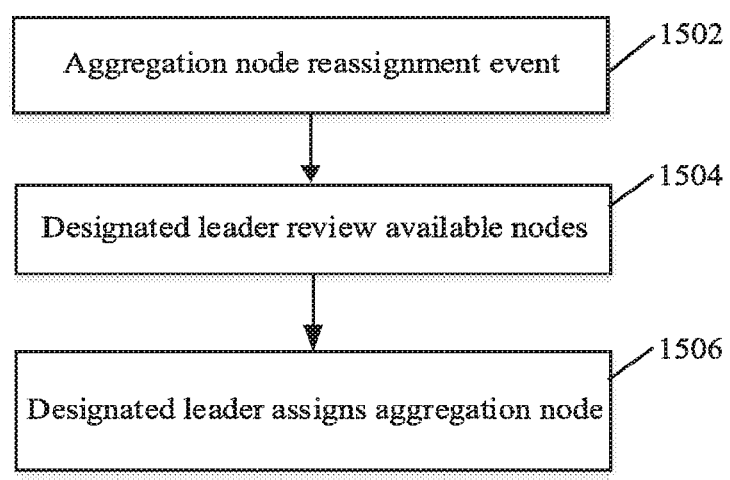
FIG. 15 is a simplified flow chart illustrating a process by which a designated leader selects a node to aggregate data for a cluster or table.

Turning to FIG. 15, the process by which a new aggregation node is assigned is illustrated. There are two events that may cause a new aggregation node to be assigned; first, on system startup, aggregation nodes may be assigned, and second, when the designated leader loses contact with an aggregation node for longer than a predetermined time period, such as, for example, 30 seconds or one minute. One of those events is noted by the designated leader in step 1502. Then, in step 1504, the designated leader reviews the available nodes, and in step 1506, the designated leader selects one of the available nodes.

Figure 16:
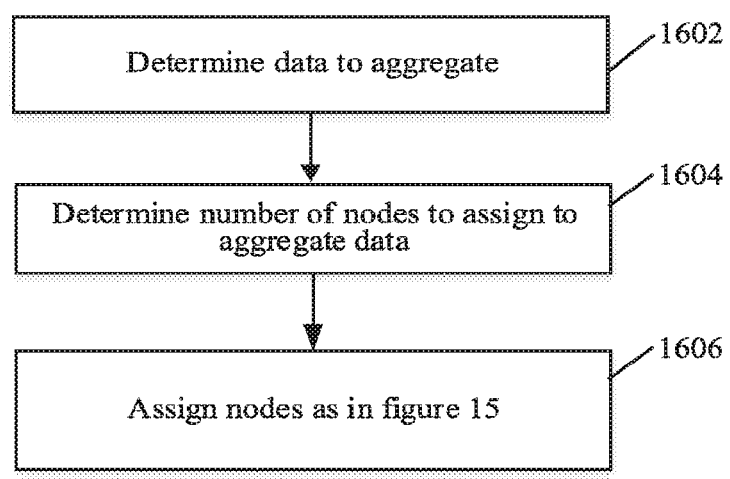
FIG. 16 is a simplified flow chart illustrating a process by which a designed leader determines a number of nodes to select to aggregate data.

In certain cases, more than one node may be assigned to aggregate data for a particular cluster or table. For example, for a cluster with many nodes; i.e., 64, the designated leader may assign four nodes to aggregate data, each of which will collect data from fifteen other nodes and aggregate that data with its own data. FIG. 16 illustrates the process by which the designated leader determines how many nodes are required to aggregate data. In step 1602, the designated leader determines the amount of data to aggregate. Then, in step 1604, the designated leader determines the number of nodes to assign to aggregate data. Finally, in step 1606, nodes are assigned to aggregate data as in FIG. 15.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A database management system comprising:
   a coding cluster for storing data, wherein the coding cluster includes a plurality of nodes, wherein each node of the plurality of nodes includes:
   a server having a network interface; and
   a switch coupled to the network interface, wherein the switch allows each node to communicate with other nodes of the plurality of nodes;
   wherein, in response to an election event, a majority of the plurality of nodes select via a consensus protocol, one of the plurality of nodes as a designated leader node and wherein the plurality of nodes includes at least two other nodes; and
   wherein the designated leader node performs operations that include maintaining a collection of coding lines associated with the plurality of nodes, the collection of coding lines including an inventory of open coding lines of the collection of coding lines having at least one open coding block and wherein the maintaining the collection of coding lines maintains at least one open coding line for each node of the plurality of nodes.

2. The database management system of claim 1, wherein the consensus protocol includes nodes of the plurality of nodes randomly voting for any node of the plurality of nodes.

3. The database management system of claim 1, wherein the designated leader node maintains at least one open coding line for each node of the plurality of nodes by creating a new open coding line to add to the collection of coding lines when the inventory of the open coding lines for a node is empty.

4. The database management system of claim 1, wherein the election event includes the majority of the plurality of nodes losing contact with a prior designated leader node.

5. The database management system of claim 1, wherein the election event includes a verified failure of a prior designated leader node.

6. The database management system of claim 1, wherein the election event includes a system startup.

7. The database management system of claim 1, wherein the operations further include:
   assigning one of the at least two other nodes to be an aggregation node that collects and aggregates performance data associated with the plurality of nodes.

8. The database management system of claim 7, wherein the performance data for a node of the plurality of nodes includes a percentage of storage utilized.

9. The database management system of claim 7, wherein the performance data for a node of the plurality of nodes includes an amount of data read in a time period.

10. The database management system of claim 7, wherein the performance data for a node of the plurality of nodes includes a total data rate in a time period.

11. The database management system of claim 7, wherein the performance data for a node of the plurality of nodes includes an amount of input transactions in a time period.

12. The database management system of claim 7, wherein the performance data for a node of the plurality of nodes includes an amount of output transactions in a time period.

13. The database management system of claim 7, wherein the performance data for a node of the plurality of nodes includes an amount of total transactions in a time period.

14. A method comprising:
providing a coding cluster for storing data, wherein the coding cluster includes a plurality of nodes, wherein each node of the plurality of nodes includes:
a server having a network interface; and
a switch coupled to the network interface, wherein the switch allows each node to communicate with other nodes of the plurality of nodes;
wherein the plurality of nodes include a designated leader node and at least two other nodes;
maintaining, via the designated leader node, a collection of coding lines associated with the plurality of nodes, the collection of coding lines including an inventory of open coding lines of the collection of coding lines having at least one open coding block and wherein the maintaining the collection of coding lines maintains at least one open coding line for each node of the plurality of nodes; and
facilitating, in response to an election event, replacing the designated leader node with a new designated leader node, wherein a majority of the plurality of nodes select, via a consensus protocol, the new designated leader node to replace the designated leader node.

15. The method of claim 14, wherein the consensus protocol includes nodes of the plurality of nodes randomly voting for any node of the plurality of nodes.

16. The method of claim 14, wherein the designated leader node maintains at least one open coding line for each node of the plurality of nodes by creating a new open coding line to add to the collection of coding lines when the inventory of the open coding lines for a node is empty.

17. The method of claim 14, wherein the election event includes the majority of the plurality of nodes losing contact with the designated leader node.

18. The method of claim 14, wherein the election event includes a verified failure of the designated leader node.

19. The method of claim 14, wherein the election event includes a system startup.

20. The method of claim 14, further comprising:
assigning, via the designated leader node, one of the at least two other nodes to be an aggregation node that collects and aggregates performance data associated with the plurality of nodes.

* * * * *